United States Patent Office 3,136,789
Patented June 9, 1964

3,136,789
ALKYL ETHERS OF 17β-HYDROXY STEROIDS OF THE ANDROSTANE SERIES AND PROCESS OF PREPARING THE SAME
Roger E. Beyler, Carbondale, Ill., assignor to Merck & Co., Inc., Rahway, N.J., a corporation of New Jersey
No Drawing. Filed July 13, 1961, Ser. No. 123,661
3 Claims. (Cl. 260—397.4)

This invention is concerned generally with novel steroids and processes of preparing the same. More particularly, it relates to ethers of 17β-hydroxy-compounds of the androstane series. The compounds possess useful therapeutic properties as orally and parenterally active progestational agents.

Among the compounds of this invention are 17β-ether-derivatives of steroids having the basic formula:

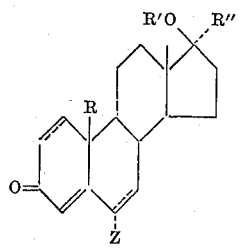

wherein the dotted lines between carbons 1–2 and 6–7 indicate that a double bond may be present in these positions, and wherein R is a hydrogen or a methyl substituent, $R_1$ is a monovalent hydrocarbon radical and R″ is $CH_3$, $C_2H_5$, —CH=$CH_2$, —CH≡CH or —C≡$CH_3$, Z is α-methyl, α-chloro or α-fluoro.

Certain of the parent steroids are compounds known to have progestational activity. The 17β-ether derivatives of such compounds have been found to have markedly improved physiological activity when compared to the parent 17β-hydroxy steroid.

The process of this invention essentially comprises contacting a 17β-hydroxy steroid of the androstane series with a monohalogenated hydrocarbon in which the halogen substituent is either bromine or iodine in the presence of a mild base such as silver oxide to form the corresponding 17β-ether. Included among the halogenated hydrocarbons which may be used in the process of my invention are saturated alkyl bromides or iodides including cycloalkyl as, for example, methyl iodide, ethyl iodide, n-propyl iodide, n-pentyl iodide, ethyl bromide, n-propyl bromide, isopropyl bromide, n-pentyl bromide and bromocyclohexane; aralkyl bromides and iodides as, for example, benzyl iodide and benzyl bromide; and unsaturated halogenated hydrocarbons such as allyl iodide, and methallyl iodide. By selecting one of the above-named halogenated hydrocarbons and reacting it with a selected 17β-hydroxy steroid of the androstane series in accordance with the process of my invention, there is formed the corresponding 17β-ether of the starting 17β-hydroxy steroid in which the hydrogen of the 17β-hydroxy group is replaced by a hydrocarbon radical derived from the selected hydrocarbon reactant.

In order to bring about etherification of the 17β-hydroxy group it is necessary to employ, in addition to the halogenated hydrocarbon, a mild base such as silver oxide. An especially desirable form of silver oxide is prepared by the following procedure: 1 part by weight of silver nitrate is dissolved in approximately 10 parts by weight of water. Another solution is prepared by dissolving 0.23 parts by weight of pure sodium hydroxide in approximately 10 parts by weight of water. The two solutions are heated to approximately 86° C. and mixed, whereupon the silver oxide precipitates. The supernatant liquid is decanted and the silver oxide precipitate is washed by decantation with 5 portions of hot water or until the washings are essentially neutral. The precipitate of silver oxide is then filtered and air-dried. The precipitated, dried silver oxide is then slurried in about 5 parts of hot ethanol. The ethanol is decanted from the precipitate and the precipitate is then washed several more times with hot ethanol by decantation. The washed precipitate is filtered and air-dried, and then dried in a desiccator over phosphorus pentoxide.

The solvent used for carrying out the etherification reaction may be any one which is inert or unreactive under the conditions of the etherification reaction. Thus, solvents which are effective as diluents are hydrocarbons as, for example, benzene, toluene, xylene; ethers such as diethyl ether, dioxane, tetrahydrofuran and anisole; N,N-dialkyl acylamides as, for example, N,N-dimethylacetamide, N,N-dimethylformamide and N,N-diethylformamide, and nitriles such as acetonitrile. In addition to solvents which may act as diluents for the reagent, the monohalogenated hydrocarbon may act as a solvent for the reaction and, when it is desired to use large excesses of the monohalogenated hydrocarbon reactant, it may be desirable to use, instead of an additional solvent, the reagent itself as a solvent for the reaction.

The temperature at which the reaction is carried out is partially dependent on the time and does not appear to be the sole critical factor in the yield or purity of the product obtained. Thus, temperatures which vary from approximately 5° C. to the reflux temperature of the solvent employed appear to be satisfactory. Thus, we have found that when the reactants are mixed in the presence of a solvent at approximately 25° C. for a period of about 16 hours, good yields of product are obtained. Another method which has been found to produce satisfactory yields of the ether involves refluxing the steroid in the presence of silver oxide and methyl iodide for approximately 7 hours with no additional solvent added to the reaction mixture.

In a preferred mode of operation the 17β-methoxy steroid is prepared from the corresponding 17β-hydroxy-steroid by mixing the steroid with a large molar excess of methyl iodide and dimethylformamide as a solvent in the presence of silver oxide. The mixture is stirred at room temperature for about 4 days. The product is recovered by extractoin and chromatography.

The 17β-ether formed may itself have valuable physiological activity, or may be converted into another compound having enhanced activity by further chemical reactions such as are described, for example, in the preparation of the following specific compounds:

The 6α - chloro - 17α - ethynyl - 17β - methoxy - 4-androstene-3-one is prepared by heating the 17α-ethynyl-17β-methoxy-4-androstene-3-one with acetic anhydride and p-toluenesulfonic acid to form the 3-acetoxy-17α-ethynyl-17β-methoxy-3,5-androstadiene, which is then reacted with N-chlorosuccinimide in tetrahydrofuran solution containing 5% dry HCl to form the 6α-chloro-17α-ethynyl-17β-methoxy-4-androstene-3-one.

The 6α-chloro-17α-ethynyl-17β-methoxy-1,4-androstadiene-3-one is obtained from the 6α-chloro-17α-ethynyl-17β-methoxy-4-androstene on reaction of the latter compound with selenium dioxide.

The 6-chloro-17α-ethynyl-17β-methoxy-4,6 - androstadiene-3-one is prepared by reaction of the 6α-chloro-17α-ethynyl - 17β-hydroxy-4-androstene-3-one with chloranil to form the 6-chloro-17α-ethynyl-17β-hydroxy-4,6-androstadiene-3-one and then contacting the latter compound with methyl iodide and silver oxide in dimethylformamide solution.

The 6-chloro-17α-ethynyl-17β-methoxy-1,4,6-androstatriene-3-one is prepared by the reaction of 6-chloro-17α- ethynyl-17β-methoxy-4,6-androstadiene-3-one with selenium dioxide.

The 17α-ethynyl-6α-fluoro-17β-methoxy-4-androstene-3-one is prepared by reaction of 3-acetoxy-17α-ethynyl-17β-methoxy-3,5-androstadiene with perchloryl fluoride in aqueous tetrahydrofuran solution.

The 17α-ethynyl-6α-fluoro-17β-methoxy-1,4-androstadiene-3-one is prepared by reaction of 17α-ethynyl-6α-fluoro-17β-methoxy-4-androstene-3-one with selenium dioxide.

The 17α-ethynyl-6-fluoro-17β-methoxy-4,6-androstadiene-3-one is obtained by reaction of the 17α-ethynyl-6α-fluoro-17β-methoxy-4-androstene-3-one with chloranil.

The 17α-ethynyl-6-fluoro-17β-methoxy-1,4,6-androstatriene-3-one is prepared by the reaction of 17α-ethynyl-6-fluoro-4,6-androstadiene-3-one with selenium dioxide.

The 6α - chloro - 17α - ethynyl-17β-methoxy-19-nor-4-androstene-3-one is prepared by heating 17α-ethynyl-17β-methoxy-19-nor-4-androstene-3-one with acetic anhydride and p-toluenesulfonic acid to form 3-acetoxy-17α-ethynyl-17β-methoxy-19-nor-3,5-androstadiene. The latter compound is then reacted with N-chlorosuccinimide in tetrahydrofuran solution containing 5% dry HCl to form the 6α-chloro - 17α - ethynyl-17β-methoxy - 19-nor-4-androstene-3-one.

The 6α-fluoro - 17α - ethynyl - 17β-methoxy-19-nor-4-androstene-3-one is prepared by the reaction of 3-acetoxy-17α-ethynyl - 17β - methoxy - 19 - nor-3,5-androstadiene with perchloryl fluoride.

The following examples illustrate methods of carrying out the present invention but it is to be understood that these examples are given for purposes of illustration and not of limitation.

*Example 1*

A mixture of 500 mg. of 17α-ethynyl-17β-hydroxy-4-androstene-3-one, 10 ml. of dimethylformamide, 20 ml. of methyl iodide, and 1.5 gms. of silver oxide is stirred at room temperature for 3 days. An additional ½ gm. of silver oxide is added and the mixture is stirred for one day longer. One hundred ml. of chloroform is then added to the reaction mixture which is stirred for one hour and filtered. The filtrate is evaporated to dryness. The residual oil is chromatographed with acid-washed alumina and eluted with mixtures of ether and petroleum ether to give 170 mg. of crude 17α-ethynyl-17β-methoxy-4-androstene-3-one, M.P. 105–130° C. After recrystallization from ether, methanol and finally ether the pure product has a M.P. of 130–133° C.

*Analysis.*—Calculated for $C_{22}H_{30}O_2$: C, 80.93; H, 9.26. Found: C, 81.00; H, 9.50.

In accordance with the above procedure, but starting with the 17α-methyl- or 17α-propynyl-17β-hydroxy-4-androstene-3-one in place of the 17α-ethynyl-17β-hydroxy-4-androstene-3-one, there is obtained the 17α-methyl- or 17α-propynyl-17β-methoxy-4-androstene-3-one.

In the manner described above but using ethyl iodide, allyl iodide, or benzyl iodide in place of methyl iodide, the product obtained is 17β-ethoxy-, 17β-allyloxy- or 17β-benzyloxy-17α-ethynyl-4-androstene-3-one.

*Example 2*

A mixture of 500 mg. of 17α-ethynyl-17β-hydroxy-6α-methyl-4-androstene-3-one, 10 ml. of dimethyl formamide, 20 ml. of methyl iodide, and 1.5 gms. of silver oxide is stirred at room temperature for 4 days. An additional ½ gm. of silver oxide is added at the end of each day. One hundred ml. of chloroform is then added to the reaction mixture. The mixture is stirred for one hour, filtered, and the filtrate evaporated to dryness. The residual oil is chromatographed with acid-washed alumina and eluted with mixtures of ether and petroleum ether to give 17α-ethynyl-6α-methyl-17β-methoxy-4-androstene-3-one.

*Example 3*

A mixture of 1 g. of 17α-ethynyl-17β-methoxy-4-androstene-3-one, 10 ml. of acetic anhydride and 100 mg. of p-toluenesulfonic acid is heated on the steam bath for one hour and allowed to stand overnight at room temperature. It is then poured into ice water and left to stand at room temperature for one half hour. The reaction mixture is then extracted with ether. The ether extract is washed with water and aqueous sodium bicarbonate, dried, and concentrated to yield the 3-acetoxy-17α-ethynyl-17β-methoxy-3,5-androstadiene.

To a solution of 200 mg. of the 3-acetoxy-17α-ethynyl-17β-methoxy-3,5-androstadiene dissolved in 2 ml. of acetic acid is added, with stirring, 56 ml. of N-chlorosuccinimide and 2 ml. of tetrahydrofuran containing 5% of dry HCl. The reaction is stirred at room temperature for 2½ hours. Sodium bicarbonate is added. The reaction mixture is then extracted with ether. The ether extracts are dried and concentrated. The material is chromatographed over acid-washed alumina and eluted with ether-petroleum ether mixtures to give 6α-chloro-17α-ethynyl-17β-methoxy-4-androstene-3-one.

To 100 mg. of 6α-chloro-17α-ethynyl-17β-methoxy-4-androstene-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed for an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 6α-chloro-17α-ethynyl-17β-methoxy-1,4-androstadiene-3-one.

A suspension of 1 g. of 6α-chloro-17α-ethynyl-17β-hydroxy-4-androstene-3-one and 2.4 g. of chloranil in 30 ml. of ethyl acetate and 6 ml. of acetic acid is stirred and refluxed for 16 hours. The reaction mixture is cooled and filtered. The product is washed sequentially with aqueous sodium bisulfite, aqueous potassium hydroxide and water. Chromatography yields 6-chloro-17α-ethynyl-17β-hydroxy-4,6-androstadiene-3-one which is crystallized from ethyl acetate.

A mixture of 500 mg. of 6-chloro-17α-ethynyl-17β-hydroxy-4,6-androstadiene-3-one, 10 ml. of dimethylformamide, 20 ml. of methyl iodide, and 1.5 gms. of silver oxide is stirred at room temperature for 4 days. An additional ½ gm. of silver oxide is added at the end of each day. One hundred ml. of chloroform is added to the reaction mixture which is stirred for one hour and filtered. The filtrate is then taken to dryness. The oil is chromatographed with acid-washed alumina and eluted with mixtures of ether and petroleum ether to give 6 - chloro - 17α - ethynyl - 17β - methoxy - 4,6 - androstadiene-3-one.

To 100 mg. of 6-chloro-17α-ethynyl-17β-methoxy-4,6-androstadiene-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue gives the 6-chloro-17α-ethynyl-17β-methoxy-1,4,6-androstatriene-3-one.

Example 4

A solution of 3-acetoxy-17α-ethynyl-17β-methoxy-3,5-androstadiene—(Example 3) in aqueous tetrahydrofuran is treated with a slow stream of perchloryl fluoride for one hour and then allowed to stand at room temperature for an additional 2 hours. The reaction mixture is poured on ice and extracted with chloroform. The chloroform layer is washed with aqueous sodium bicarbonate solution, dried and concentrated in vacuo. The crude material is dissolved in acetic acid saturated with gaseous hydrogen chloride and allowed to stand for one hour at room temperature. The reaction mixture is poured on ice and extracted with chloroform. The chloroform layer is washed with aqueous bicarbonate solution, dried and concentrated in vacuo. The concentrate is chromatographed on acid-washed alumina to yield the 17α-ethynyl-6α-fluoro-17β-methoxy-4-androstene-3-one.

To 100 mg. of 17α-ethynyl-6α-fluoro-17β-methoxy-4-androstene-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered and the filtrate is evaporated to dryness. The residue is extracted with ethyl acetate and the extract is washed successively with aqueous sodium bicarbonate, water, dilute hydrochloric acid and water, and then dried over magnesium sulfate. The extract is treated with activated charcoal and then concentrated to dryness. Crystallization of the residue gives 17α-ethynyl-6α-fluoro-17β-methoxy-1,4-androstadiene-3-one.

A suspension of 1 g. of 17α-ethynyl-6α-fluoro-17β-methoxy-4-androstene-3-one, 2.4 g. of chloranil, 30 ml. of ethyl acetate and 6 ml. of acetic acid is stirred and refluxed for 16 hours. The reaction mixture is cooled and filtered. The product is washed sequentially with aqueous sodium bisulfite, aqueous potassium hydroxide and water. The organic layer is dried and concentrated in vacuo. Chromatography yields 17α-ethynyl-6-fluoro-17β-methoxy-4,6-androstadiene-3-one.

To 100 mg. of 17α-ethynyl-6-fluoro-17β-methoxy-4,6-androstadiene-3-one in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, water, dilute hydrochloric acid and water, and then dried over magnesium sulfate. The extract is treated with activated charcoal and then concentrated to dryness. Crystallization of the residue gives 17α-ethynyl-6-fluoro-17β-methoxy-1,4,6-androstatriene-3-one.

Example 5

A solution of 100 mg. of the 17α-ethynyl-17β-methoxy-4-androstene-3-one and 50 mg. of Lindlar catalyst (lead deactivated palladium on a calcium carbonate support), in 10 cc. of ethyl acetate is treated with hydrogen until one mole of hydrogen has been absorbed. The mixture is filtered and concentrated. Chromatography yields the 17β-methoxy-17α-vinyl-4-androstene-3-one.

In accordance with the above procedure, but starting with the 6α-chloro-, 6α-fluoro-, or 6α-methyl-17α-ethynyl-17β-methoxy-4-androstene-3-one in place of the 17α-ethynyl-17β-methoxy-4-androstene-3-one there is obtained the corresponding 6α-chloro-, 6α-fluoro-, or 6α-methyl-17β-methoxy-17α-vinyl-4-androstene-3-one.

A suspension of platinum oxide in 10 cc. of ethanol is reduced and 100 mg. of 17α-ethynyl-17β-methoxy-4-androstene-3-one is added. Reduction proceeds until two moles of hydrogen have been absorbed. The solution is filtered, concentrated and chromatographed on alumina to yield the 17α-ethyl-17β-methoxy-4-androstene-3-one.

In accordance with the above procedure, but starting with the 6α-chloro-, 6α-fluoro-, or 6α-methyl-17α-ethynyl-17β-methoxy-4-androstene-3-one in place of the 17α-ethynyl-17β-methoxy-4-androstene-3-one there is obtained the corresponding 6α-chloro-, 6α-fluoro-, or 6α-methyl-17α-ethyl-17β-methoxy-4-androstene-3-one.

Example 6

A mixture of 500 mg. of the 17α-ethynyl-17β-hydroxy-19-nor-4-androstene-3-one, 10 ml. of dimethylformamide, 20 ml. of methyl iodide, and 1.5 gm. of silver oxide is stirred at room temperature for 4 days. An additional ½ gm. of silver oxide is added at the end of each day. One hundred ml. of chloroform is then added to the reaction mixture which is stirred for one hour and filtered. The filtrate is evaporated to dryness. The residual oil is chromatographed with acid-washed alumina and eluted with mixtures of ether and petroleum ether to give 143 mg. of crude 17α-ethynyl-17β-methoxy-19-nor-4-androstene-3-one. The product is recrystallized from methanol and from ether, M.P. 126–128° C.

*Analysis.*—Calculated for $C_{21}H_{28}O_2$: C, 80.73; H, 9.03. Found: C, 80.64; H, 9.25.

In manner described above, but using ethyl iodide, allyl iodide or benzyl iodide in place of methyl iodide, the product obtained is 17β-ethoxy-, 17β-allyloxy- or 17β-benzyloxy-19-nor-4-androstene-3-one.

Example 7

A mixture of 500 mg. of 17α-ethynyl-17β-hydroxy-6α-methyl-19-nor-4-androstene-3-one, 10 ml. of dimethylformamide, 20 ml. of methyl iodide, and 1.5 gms. of silver oxide is stirred at room temperature for 4 days. An additional ½ gm. of silver oxide is added at the end of each day. One hundred ml. of chloroform is then added to the reaction mixture which is stirred for one hour and filtered. The filtrate is evaporated to dryness. The residual oil is chromatographed with acid-washed alumina and eluted with mixtures of ether and petroleum ether to give 17α-ethynyl-6α-methyl-17β-methoxy-19-nor-4-androstene-3-one.

The starting material is prepared by the following procedure:

A mixture of 1 g. of 17α-ethynyl-17β-hydroxy-19-nor-4-androstene-3-one, 10 ml. of acetic anhydride and 100 mg. of p-toluenesulfonic acid is heated on the steam bath for one hour and allowed to stand overnight at room temperature. It is then poured into ice water and left to stand at room temperature for one half hour. The reaction mixture is then extracted with ether. The ether extract is washed with water and aqueous sodium bicarbonate, dried, and concentrated to yield the crude 17α-ethynyl-19-nor-3,5-androstadiene-3β,17β-diol diacetate.

A solution of 8 gms. of 17α-ethynyl-19-nor-3,5-androstadiene-3,17β-diol diacetate in a mixture of 700 ml. of 95% ethanol and 300 ml. of tetrahydrofuran is cooled to 10° C. and added dropwise, with occasional stirring, over a one hour period, to a cold (0° C.) solution of 18 g. of sodium borohydride in 400 ml. of 80% ethanol, the reaction temperature not being allowed to exceed 5° C. After completion of the addition, the solution is held at 0–5° C. for an additional two hours. A solution of $NaH_2PO_4$ is then added to adjust the pH to about 5. The mixture is then concentrated in vacuo to a small volume, diluted with water and extracted with chloroform. The extract is washed with water, dried and concentrated. The concentrate is chromatographed over acid-washed alumina and eluted with ether-petroleum ether mixtures to give 17α-ethynyl-19-nor-5-androstene-3β,17β-diol 17β-acetate.

Ten grams of 17α-ethynyl-19-nor-5-androstene-3β,17β-diol 17β-acetate in 150 ml. of tetrahydrofuran is treated with 100 ml. of 0.9M monoperphthalic acid in ethyl acetate and allowed to stand overnight at room temperature. The reaction mixture is diluted with ethyl acetate and washed sequentially with aqueous sodium bicarbonate, sodium bisulfite, and sodium bicarbonate solution. The organic layer is dried and concentrated in vacuo. The product is fractionally crystallized from aqueous ethanol to yield the 17α-ethynyl-19-nor-androstane-3β,17β-diol-5,6α-oxide 17β-acetate.

Five grams of 17α-ethynyl-19-nor-androstane-3β,17β-diol-5,6α-oxide 17β-acetate in about 200 ml. of benzene is added to a reagent prepared from 3.4 g. of magnesium, 10 ml. of methyl iodide and 45 ml. of ether. The mixture is stirred and 70 ml. of solvent is removed by distillation. After refluxing for 5 hours, the mixture is cooled, acidified with dilute hydrochloric acid and the organic layer washed to neutrality. The organic phase is dried and concentrated in vacuo. Crystallization from aqueous ethanol gives the 17α-ethynyl-6β-methyl-19-nor-androstane-3β,5α,17β-triol.

The oxidizing reagent is prepared by diluting 2.7 g. of $CrO_3$ and 2.3 ml. of concentrated sulfuric acid to 10 ml. with water. A solution of 1.90 g. of 17α-ethynyl-6β-methyl-19-nor-androstane-3β,5α,17β-triol in 300 ml. of acetone is cooled to 0° C. and treated with 1.85 ml. of the oxidizing reagent for about 5 minutes. The solution is diluted with ice water and extracted with ether. The ether extract is washed sequentially with water, and aqueous sodium bicarbonate and then dried and concentrated in vacuo, to give 17α-ethynyl-6β-methyl-19-nor-androstane-5α,17β-diol-3-one. The crude product is dissolved in 150 ml. of methanol, 75 ml. of 1 N sodium hydroxide is added, and the mixture is stirred at room temperature under nitrogen for 24 hours. The mixture is concentrated to half volume under vacuo at 25° C. and then poured into ice water. The product is extracted with ether. The ether layer is washed with water, dried and concentrated. The concentrate is chromatographed on acid-washed alumina and the product eluted with ether-petroleum ether mixtures to yield 17α-ethynyl-17β-hydroxy-6α-methyl-19-nor-4-androstene-3-one.

*Example 8*

A mixture of 1 g. of 17α-ethynyl-17β-methoxy-19-nor-4-androstene-3-one, 10 ml. of acetic anhydride and 100 mg. of p-toluenesulfonic acid is heated on the steam bath for one hour and allowed to stand overnight at room temperature. It is then poured into ice water and left to stand at room temperature for one half hour. The reaction mixture is then extracted with ether. The ether extract is washed with water and aqueous sodium bicarbonate, dried, and concentrated to yield the crude 3-acetoxy - 17α - ethynyl - 17β - methoxy - 19 - nor - 3,5-androstadiene.

To a solution of 200 mg. of the 3-acetoxy-17α-ethynyl-17β-methoxy-19-nor-3,5-androstadiene dissolved in 2 ml. of acetic acid is added, with stirring, 56 mg. of N-chlorosuccinimide and 2 ml. of tetrahydrofuran containing 5% of dry HCl. The reaction is stirred at room temperature for 2½ hours. Sodium bicarbonate is added. The reaction mixture is then extracted with ether. The ether extracts are dried and concentrated. The material is chromatographed over acid-washed alumina, and eluted with ether-petroleum ether mixtures to give 6α-chloro-17α-ethynyl-17β-methoxy-19-nor-4-androstene-3-one.

*Example 9*

A solution of the 3-acetoxy-17α-ethynyl-17β-methoxy-19-nor-3,5-androstadiene in aqueous tetrahydrofuran is treated with a slow stream of perchloryl fluoride for one hour and then allowed to stand at room temperature for an additional 2 hours. The reaction mixture is poured on ice and extracted with chloroform. The chloroform layer is washed with aqueous bicarbonate solution, dried and concentrated in vacuo. The crude material is dissolved in acetic acid saturated with gaseous hydrogen chloride and allowed to stand for one hour at room temperature. The reaction mixture is poured on ice and extracted with chloroform. The chloroform layer is washed with aqueous bicarbonate solution, dried and concentrated in vacuo. The concentrate is chromatographed on acid-washed alumina to yield the 17α-ethynyl-6α-fluoro-17β-methoxy-19-nor-4-androstene-3-one.

*Example 10*

A solution of 100 mg. of 17α-ethynyl-17β-methoxy-19-nor-4-androstene-3-one and 50 mg. of Lindlar catalyst in 10 cc. of ethyl acetate is treated with hydrogen until one mole of hydrogen has been absorbed. The mixture is filtered and concentrated to yield the crude vinyl compound. Chromatography yields the 17β-methoxy-17α-vinyl-19-nor-4-androstene-3-one.

In accordance with the above procedure, but starting with the 6α-chloro-, 6α-fluoro-, or 6α-methyl-17α-ethynyl-17β-methoxy-19-nor-4-androstene-3-one in place of the 17α - ethynyl - 17β - methoxy-19-nor-4-androstene-3-one, there is obtained the corresponding 6α-chloro-, 6α-fluoro-, or 6α-methyl-17β-methoxy-17α-vinyl-19-nor-4-androstene-3-one.

A suspension of platinum oxide in 10 cc. of ethanol is reduced and 100 mg. of 17α-ethynyl-17β-methoxy-19-nor-4-androstene-3-one is added. Reduction proceeds until two moles of hydrogen have been absorbed. The solution is filtered, concentrated and chromatographed on alumina to yield the corresponding 17α-ethyl-17β-methoxy-19-nor-4-androstene-3-one.

In accordance with the above procedure, but starting with the 6α-chloro-, 6α-fluoro-, or 6α-methyl-17α-ethynyl-17β-methoxy-19-nor-4-androstene-3-one in place of the 17α - ethynyl - 17β - methoxy-19-nor-4-androstene-3-one, there is obtained the corresponding 6α-chloro-, 6α-fluoro-, or 6α-methyl-17α-ethyl-17β-methoxy-19-nor-4-androstene-3-one.

Various changes and modifications may be made in carrying out the present invention without departing from the spirit and scope thereof. Insofar as these changes and modifications are within the purview of the annexed claims, they are to be considered as part of our invention.

I claim:
1. 6-chloro-17α-ethynyl-17β-methoxy-1,4,6-androstatriene-3-one.
2. 17α-ethynyl-6-fluoro - 17β - methoxy-4,6-androstadiene-3-one.
3. 17α-ethynyl-6-fluoro - 17β - methoxy-1,4,6-androstatriene-3-one.

References Cited in the file of this patent

UNITED STATES PATENTS

| | | |
|---|---|---|
| 2,334,695 | Butenandt et al. | Nov. 23, 1943 |
| 2,374,369 | Miescher et al. | Apr. 24, 1945 |
| 2,739,974 | Colton | Mar. 27, 1956 |
| 2,939,819 | Barton et al. | June 7, 1960 |
| 3,012,045 | Colton et al. | Dec. 5, 1961 |
| 3,052,693 | Engelfried et al. | Sept. 4, 1962 |

OTHER REFERENCES

Migrdichian: "Organic Synthesis," vol. 1, Reinhold Pub. Corp., New York, p. 78 (1957).
Derwent Belgian Rep. No. 55 A, p. A25, June 30, 1959.
Knox et al.: 82 J.A.C.S., pp. 1230–1235 (1960).